US011987264B2

(12) United States Patent
Thakur et al.

(10) Patent No.: US 11,987,264 B2
(45) Date of Patent: May 21, 2024

(54) METHOD AND SYSTEM FOR RECOGNIZING ACTIVITIES IN SURROUNDING ENVIRONMENT FOR CONTROLLING NAVIGATION OF AUTONOMOUS VEHICLE

(71) Applicants: Wipro Limited, Bangalore (IN); Indian Institute of Science, Bangalore (IN)

(72) Inventors: Chetan Singh Thakur, Bangalore (IN); Anirban Chakraborty, Bengaluru (IN); Sathyaprakash Narayanan, Chennai (IN); Bibrat Ranjan Pradhan, Bhubaneswar (IN)

(73) Assignees: Wipro Limited, Bangalore (IN); Indian Institute of Science, Bangalore (IN)

( * ) Notice: Subject to any disclaimer, the term of this patent is extended or adjusted under 35 U.S.C. 154(b) by 409 days.

(21) Appl. No.: 17/377,761

(22) Filed: Jul. 16, 2021

(65) Prior Publication Data

US 2022/0324477 A1     Oct. 13, 2022

(30) Foreign Application Priority Data

Mar. 31, 2021    (IN) .............................. 202141014742

(51) Int. Cl.
*G06T 7/246*    (2017.01)
*B60W 60/00*    (2020.01)
(Continued)

(52) U.S. Cl.
CPC .......... *B60W 60/001* (2020.02); *G06N 3/045* (2023.01); *G06T 7/246* (2017.01); *G06V 20/40* (2022.01);
(Continued)

(58) Field of Classification Search
CPC ............. B60W 60/001; G06T 7/246; G06T 2207/20084; G06T 2207/30252; G06V 20/40; G06V 20/56; G06N 3/045
(Continued)

(56) References Cited

U.S. PATENT DOCUMENTS 10,235,565 B2 *   3/2019   Zink .................... G06V 20/597
10,345,447 B1 *   7/2019   Hicks .................... G01S 7/4863
(Continued)

FOREIGN PATENT DOCUMENTS

WO    WO-2020260378 A1 * 12/2020 .............. E05F 15/73

OTHER PUBLICATIONS

Hu Cao, Fusion-Based Feature Attention Gate Component for Vehicle Detection Based on Event Camera, Sep. 22, 2021, IEEE Sensors Journal, vol. 21 No 21 (Year: 2021).*
(Continued)

*Primary Examiner* — Elaine Gort
*Assistant Examiner* — Matthias S Weisfeld
(74) *Attorney, Agent, or Firm* — Finnegan, Henderson, Farabow, Garrett & Dunner, LLP

(57) ABSTRACT

A method and activity recognition system for recognising activities in surrounding environment for controlling navigation of an autonomous vehicle is disclosed. The activity recognition system receives first data feed from neuromorphic event-based camera and second data feed from frame-based RGB video camera. The first data feed comprises high-speed temporal information encoding motion associated with change in surrounding environment at each spatial location, and second data feed comprises spatio-temporal data providing scene-level contextual information associated with surrounding environment. An adaptive sampling of second data feed is performed with respect to foreground activity rate based on amount of foreground motion encoded
(Continued)

in first data feed. Further, the activity recognition system recognizes activities associated with at least one object in surrounding environment by identifying correlation between both data feed by using two-stream neural network model. Thereafter, based on the determined activities, the activity recognition system controls the navigation of the autonomous vehicle.

15 Claims, 10 Drawing Sheets

(51) Int. Cl.
  *G06N 3/045* (2023.01)
  *G06V 20/40* (2022.01)
  *G06V 20/56* (2022.01)
(52) U.S. Cl.
  CPC .... *G06V 20/56* (2022.01); *G06T 2207/20084* (2013.01); *G06T 2207/30252* (2013.01)
(58) Field of Classification Search
  USPC .......................................................... 701/28
  See application file for complete search history.

(56) References Cited

U.S. PATENT DOCUMENTS

| 10,387,741 | B2 | 8/2019 | Zink et al. | |
| 10,387,774 | B1 | 8/2019 | Cao et al. | |
| 11,694,304 | B2* | 7/2023 | Kepple | G06N 3/045 |
| | | | | 382/156 |
| 2018/0300553 | A1 | 10/2018 | Khosla | |
| 2020/0026287 | A1* | 1/2020 | Jiang | G05B 13/027 |
| 2021/0350145 | A1* | 11/2021 | Park | G06V 20/56 |
| 2023/0247287 | A1* | 8/2023 | Jiang | H04N 23/63 |
| | | | | 348/262 |

OTHER PUBLICATIONS

Guillermo Gallego, Event-Based Vision: A Survey, Jul. 10, 2020, IEEE Transactions on Pattern Analysis and Machine Intelligence, vol. 44 No 1 (Year: 2020).*
Jianing Li, Event-Based Vision Enhanced: A Joint Detection Framework in Autonomous Driving, 2019, IEEE International Conference on Multimedia and Expo (Year: 2019).*
Henri Rebecq, EVO: A Geometric Approach to Event-Based 6-DOF Parallel Tracking and Mapping in Real Time, Dec. 26, 2016, IEEE Robotics and Automation Letters, vol. 2 No 2 (Year: 2016).*
Alessandro Zanardi, Cross-Modal Learning Filters for RGB-Neuromorphic Wormhole Learning, Jun. 26, 2019, Robotics: Science and Systems (Year: 2019).*
Li, J., et al., "Event-Based Vision Enhanced: A Joint Detection Framework in Autonomous Driving", 2019 IEEE, pp. 1396-1401.
Miao, S. et al., "Neuromorphic Vision Datasets for Pedestrian Detection, Action Recognition, and Fall Detection", 2019 Frontier in Neurobotics, vol. 13, Article 38, pp. 1-6.

* cited by examiner

METHOD AND SYSTEM FOR RECOGNIZING ACTIVITIES IN SURROUNDING ENVIRONMENT FOR CONTROLLING NAVIGATION OF AUTONOMOUS VEHICLE

TECHNICAL FIELD

The present subject matter is related in general to driver assistance system and activity recognitions, more particularly, but not exclusively to method and system for recognizing activities in surrounding environment using neuromorphic and frame based RGB video cameras.

BACKGROUND

In recent years, automotive industry has evolved immensely around autonomous vehicles with increasing focus towards a safe, efficient, and less computation oriented autonomous systems. Among all, vehicle activity recognition is one of primary requisites for any autonomous driving system.

Generally, during cruising of an autonomous vehicle (AV), the autonomous driving system must comprehend what other vehicles or pedestrians in vicinity are up to. This understanding of activity or motion of the other vehicles or pedestrians is an essential factor for the AV to take necessary actions, such as, whether to deaccelerate or accelerate, stop and the like. In such scenarios, an advanced driver assistance system (ADAS) of the AV requires accurate, reliable, and continuous driving-environment-perception (DEP) in terms of knowledge of position of the other vehicles or pedestrians surrounding the AV, in order to assess or detect probable activities or events that require the AV to take any preventive or corrective actions. Generally, in such instance, an approach used is to utilise on-board ranging sensors such as, camera or vision systems, radar, laser scanners and the like. This requires significant level of integration with Global Navigation Satellite System (GNSS) and inertial systems of the ADAS.

Currently, activity recognition from conventional videos feed comes with its own set of challenges such as, intraclass variation and interclass similarity, complex and diverse backgrounds, multi-subject interactions and group activities, long-distance and low-quality videos, and the like. Also, determination of accurate DEP by correlating multi-sensor feeds including GNSS increases computational complexity and resource intensive operation. Also, performing such operations on a semi-real-time mode may not be feasible to implement for an AV-ADAS system. Thus, currently, activity recognition in AV can be considered as a classical problem, which involves classification of different activities of other vehicles and pedestrians, like vehicle acceleration, deceleration, moving left, moving right, and pedestrian crossing road and the like.

Existing mechanisms analyse event data from frame-based camera feed, and other sensors such as, LIDER and the like. Conventional frame-based camera feed suffers significantly in low light conditions due to low dynamic range and high motion blur due to vehicle motion. It also generates large amount of data, requiring real-time computations which is difficult due to presence of lot of redundant information. Further, conventional frame-based cameras sample data feed at a user defined fixed interval (shutter speed), without considering dynamics of scene in the surrounding. These fixed interval shutter speed cameras are prone to motion blur that either leads to acquiring redundant information or losing salient data between the fixed intervals. Thus, a major drawback of frame-based cameras is that they require a pre-emptive mechanism to determine exposure, shutter speed and the like, acting as a payload to pre-processing. Hence, such conventional systems fail to provide relevant feed for accurate and continuous (semi-real time) DEP.

Further, in terms of activity recognition, whether being human activity, vehicle activity, gesture activity and the like, temporal features are of paramount importance to detect the activity present over a span of time. However, spatial features would pinpoint differentiation between two closely related activities.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for recognising activities in surrounding environment for controlling navigation of an autonomous vehicle. The method includes receiving a first data feed from a neuromorphic event-based camera and a second data feed from a frame-based RGB video camera. The neuromorphic event-based camera and the frame-based RGB video camera are configured in the autonomous vehicle. The first data feed comprises high-speed temporal information encoding motion associated with a change in the surrounding environment at each spatial location, and the second data feed comprises spatio-temporal data providing scene-level contextual information associated with the surrounding environment. The method includes performing adaptive sampling of the second data feed with respect to a foreground activity rate based on amount of foreground motion encoded in the first data feed. Further, the method includes recognizing activities associated with at least one object in the surrounding environment by identifying a correlation between the first data feed and the second data feed by using a two-stream neural network model. Out of the two-stream neural network model, a first neural network analyzes motion associated with the at least one object, as encoded in the first data feed. While a second neural network of the two-stream neural network model analyzes the scene-level contextual information based on the adaptive-sampled data. Thereafter, based on the determined activities, the method includes controlling the navigation of the autonomous vehicle.

In an embodiment, the present disclosure may relate to an activity recognition system for recognising activities in surrounding environment for controlling navigation of an autonomous vehicle. The activity recognition system may comprise a processor and a memory communicatively coupled to the processor, where the memory stores processor executable instructions, which, on execution, may cause the activity recognition system to receive a first data feed from a neuromorphic event-based camera and a second data feed from a frame-based RGB video camera. The first data feed comprises high-speed temporal information encoding motion associated with a change in the surrounding environment at each spatial location, and the second data feed comprises spatio-temporal data providing scene-level contextual information associated with the surrounding environment. The activity recognition system performs adaptive sampling of the second data feed with respect to a foreground activity rate based on amount of foreground motion encoded in the first data feed. Further, the activity recognition system recognizes activities associated with at least one object in the surrounding environment by identifying a correlation between the first data feed and the second data feed by using a two-stream neural network model. Out of the two-stream neural network model, a first neural network analyzes motion associated with the at least one object, as encoded in the first data feed. While a second neural network of the two-stream neural network model analyzes the scene-level contextual information based on the adaptive-sampled data. Thereafter, based on the determined activities, the activity recognition system controls the navigation of the autonomous vehicle.

In an embodiment, the present disclosure relates to a non-transitory computer readable medium including instructions stored thereon that when processed by at least one processor may cause an activity recognition system to receive a first data feed from a neuromorphic event-based camera and a second data feed from a frame-based RGB video camera. The first data feed comprises high-speed temporal information encoding motion associated with a change in the surrounding environment at each spatial location, and the second data feed comprises spatio-temporal data providing scene-level contextual information associated with the surrounding environment. The instruction causes the processor to perform adaptive sampling of the second data feed with respect to a foreground activity rate based on amount of foreground motion encoded in the first data feed. Further, the instruction causes the processor to recognize activities associated with at least one object in the surrounding environment by identifying a correlation between the first data feed and the second data feed by using a two-stream neural network model. Out of the two-stream neural network model, a first neural network analyzes motion associated with the at least one object, as encoded in the first data feed. While a second neural network of the two-stream neural network model analyzes the scene-level contextual information based on the adaptive-sampled data. Thereafter, based on the determined activities, the instruction causes the processor to control the navigation of the autonomous vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 5A:
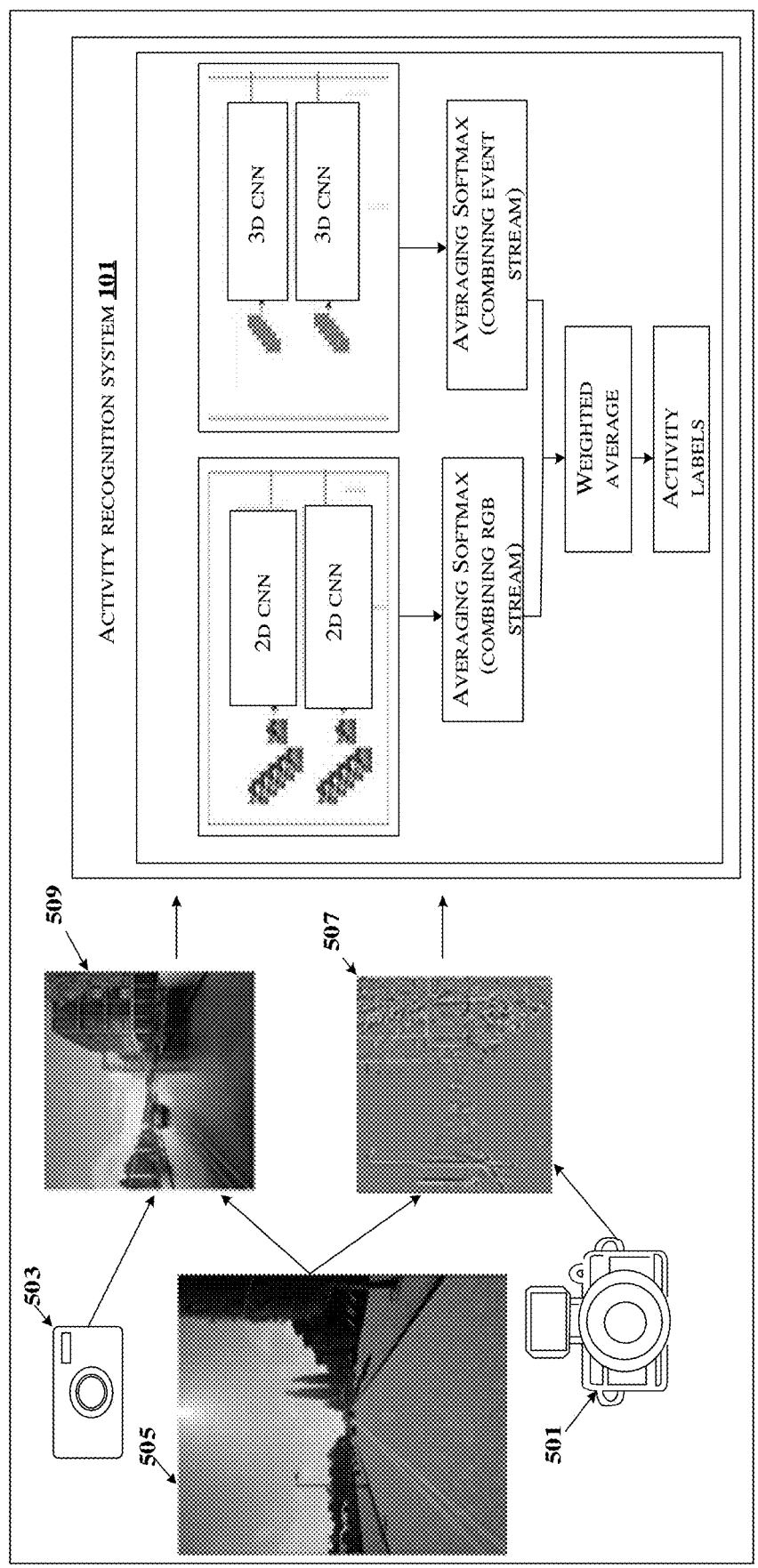
Figure 5B:
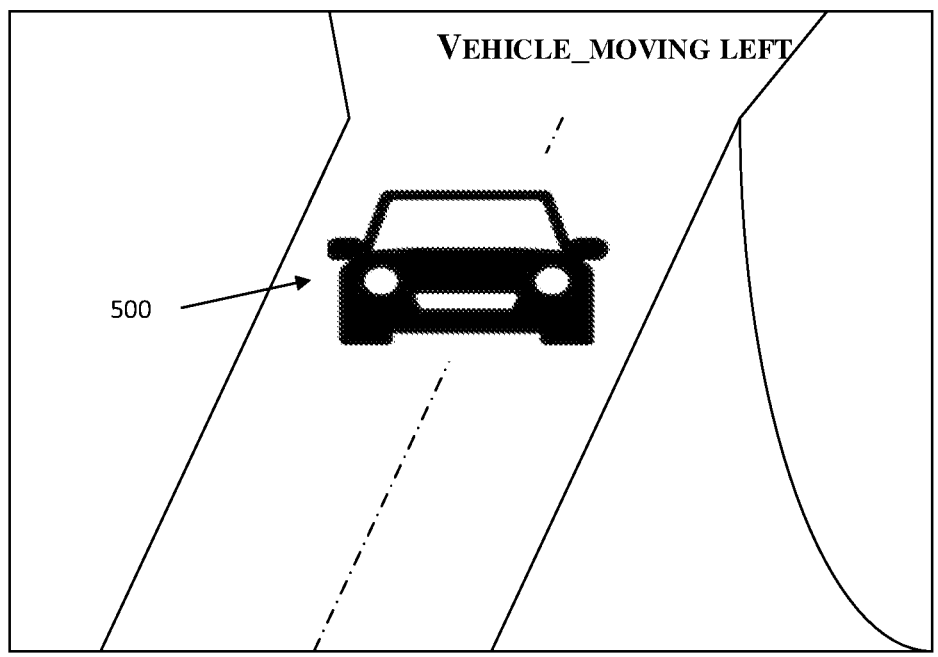
Figure 6:
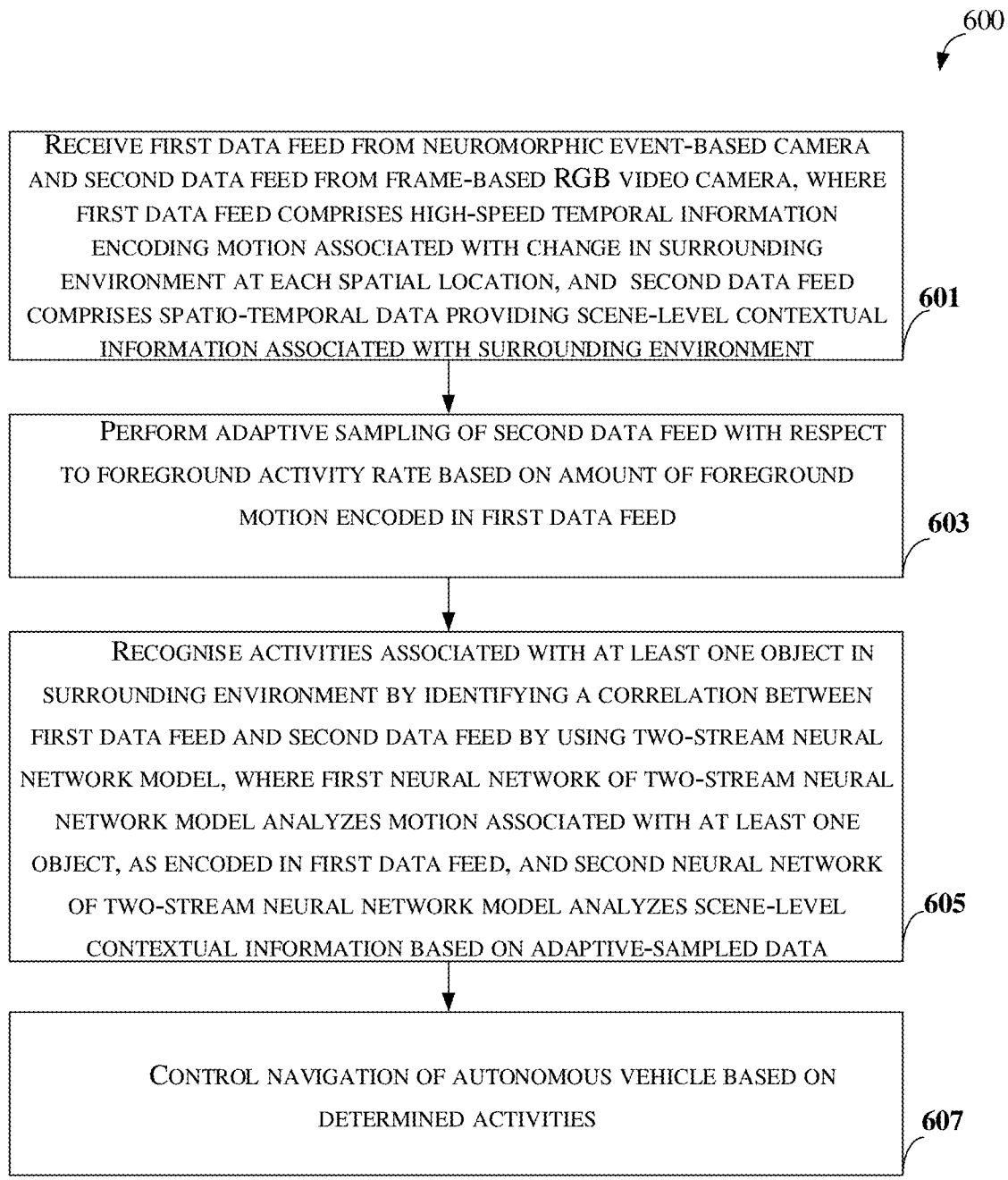

FIG. 5A shows an exemplary embodiment of surrounding environment for recognising activities, by an activity recognition system, for controlling navigation of an autonomous vehicle of present disclosure; and FIG. 5B shows an exemplary representation of output of the activity recognition system, which indicates the activity of the autonomous vehicle, i.e., an autonomous car as "moving left"; and FIG. 6 illustrates a flowchart showing a method for recognising activities in surrounding environment for controlling navigation of an autonomous vehicle in accordance with some embodiments of present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure may relate to a method and activity recognition system for recognising activities in surrounding environment. Typically, activity recognition relates to environment perception which involves monitoring activities of dynamic objects, such as, other vehicles, pedestrians, and the like, in the surrounding environment. The activities determined based on the monitoring are used further for various decision making while controlling navigation of the autonomous vehicle. Thus, activity recognition plays a crucial aspects in autonomous driving systems. In order to process environment perception, existing mechanisms mainly analyze data feed from frame-based cameras. However, these mechanism fail significantly in low light conditions due to low dynamic range, and also suffer from high motion blur due to vehicle motion. Also, amount of data generated using the frame-based cameras make real-time computation difficult as they contain a lot of redundant information.

The present disclosure resolves this problem by utilizing feeds from a neuromorphic event-based camera and frame-based RGB video camera, which are configured in the autonomous vehicle. Particularly, the present disclosure performs adaptive sampling of feed from the frame based RGB video camera with respect to a foreground activity rate which is based on motions encoded from feed of neuromorphic camera feed for identifying spatial feature of the activities. Further, activities associated with at least one object in the surrounding environment is recognised by analysing and combined both the feeds using a two-stream neural network model which identifies relevant motion and scene-level contextual information based on the adaptive-sampled data. Thereafter, the determined activities in the surrounding environment are used for controlling navigation of the autonomous vehicle. As a result, the present disclosure provides efficiency end to end trainable bio-inspired deep learning two stream architecture which bridges event data and conventional frame-based data for vehicle activity recognition which aids in spatio-temporal relevance of the activity. Thereby, eliminating extensive computations and resource overhead and helping to perform a real-time determination of driving environment perception.

Definitions of Terms

Surrounding environment: The surrounding environment refers to an area and circumstances, objects, and conditions in that area, by which the autonomous vehicle 100 is surrounded with while navigating at any path.

Object: The objects in the surrounding environment includes, but not limited to, vehicles, pedestrian, and any other mobile objects.

Activity: The activities in the surrounding environment refers to actions of objects in the surrounding environment. For instance, if a vehicle is moving right or left, pedestrian is moving or stopped, and the like.

Foreground activity: Foreground activity refers to activities associated with an object which is in motion in the surrounding environment.

Scene: A scene may be defined as type or classification of the surrounding environment. For instance, a traffic junction, railway junction, highway, an indoor scene, and the like.

Figure 1:
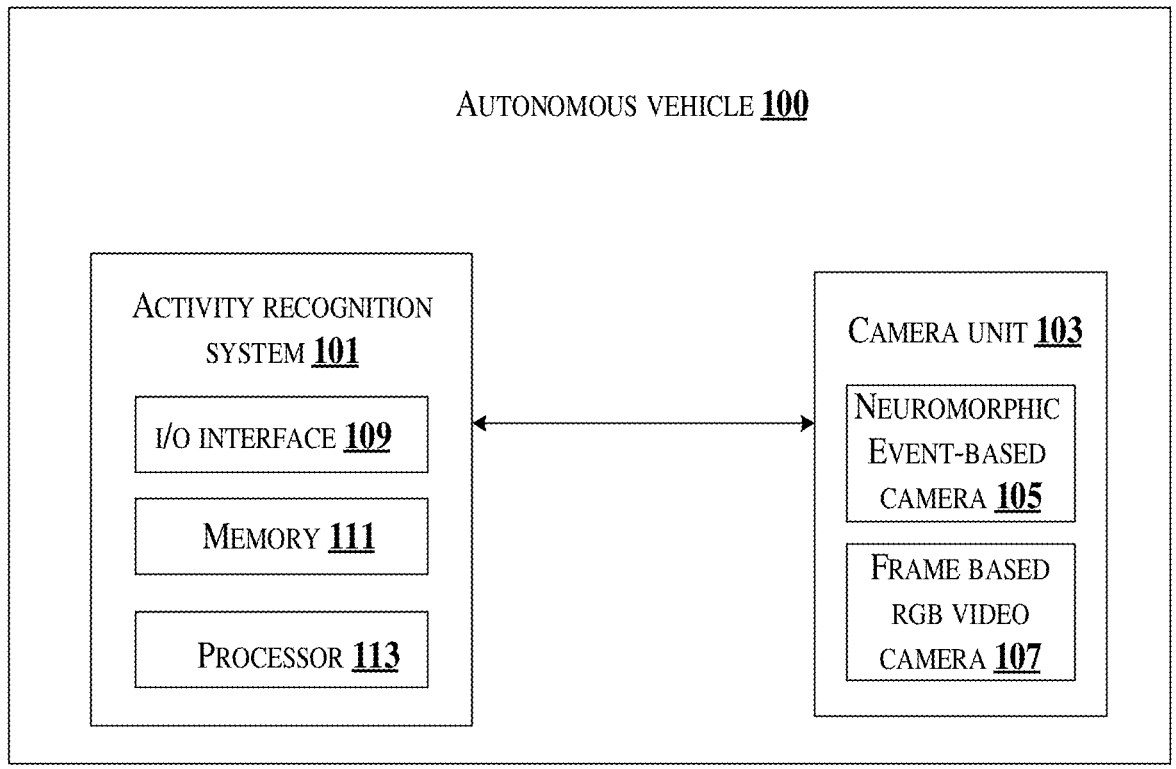
FIG. 1 illustrates an exemplary block diagram of an autonomous vehicle for recognising activities in surrounding environment for controlling navigation of an autonomous vehicle in accordance with some embodiments of the present disclosure.

FIG. 1 illustrates an exemplary block diagram of an autonomous vehicle for recognising activities in surrounding environment for controlling navigation of an autonomous vehicle in accordance with some embodiments of the present disclosure.

As shown in FIG. 1, an exemplary block of an autonomous vehicle 100 is illustrated. The autonomous vehicle 100 includes an activity recognition system 101 and a camera unit 103. A person skilled in the art would understand that the autonomous vehicle 100 may also include any other units, not mentioned explicitly in the present disclosure. The camera unit 103 comprises a neuromorphic event-based camera 105 and a frame based RGB video camera 107. The neuromorphic event-based camera 105 may refer to a camera with sensors which asynchronously measure intensity changes at each pixel independently with high temporal resolution. The neuromorphic event-based camera 105 encodes the motion information by measuring the pixel-by-pixel intensity changes from the surrounding environment. An example of neuromorphic event-based camera 105 is Dynamic Vision Sensor (DVS), DAVIS and the like. The frame based RGB video camera 107 may be equipped with a standard CMOS sensor using which colored images of surrounding environment are acquired. The frame based RGB video camera 107 captures contextual information of the surrounding environment.

The activity recognition system 101 is implemented in the autonomous vehicle 100 for recognizing activities in a surrounding environment of the autonomous vehicle 100 for controlling navigation of the autonomous vehicle 100. In an embodiment, the activity recognition system 101 may be configured within an Electronic Control Unit (ECU) (not shown explicitly in FIG. 1) of the autonomous vehicle 100. Further, the activity recognition system 101 may include an I/O interface 109, a memory 111 and a processor 113. The I/O interface 109 may be configured to receive data from the camera unit 103. The data from the I/O interface 109 may be stored in the memory 111. The memory 111 may be communicatively coupled to the processor 113 of the activity recognition system 101. The memory 111 may also store processor instructions which may cause the processor 113 to execute the instructions for recognising activities in the surrounding environment.

At any instant, while the autonomous vehicle 100 is in motion, the activity recognition system 101 receives data feeds from the camera unit 103. Particularly, the data feeds include a first data feed from the neuromorphic event-based camera 105 which includes high-speed temporal information, encoding motion associated with any change in the surrounding environment at each spatial location within a field of view of the neuromorphic event-based camera 105. The temporal information is for each spatial location in binary form, i.e., for instance, "+1, −1" for each activity in the spatial location. Particularly, the neuromorphic event-based camera 105 encodes motion with respect to foreground and foreground activities which is exhibited by objects in the foreground of the surrounding environment. While a second data feed is received from the frame based RGB video camera 107 which includes spatio-temporal data providing scene-level contextual information associated with the surrounding environment.

Further, the activity recognition system 101 performs an adaptive sampling of the second data feed with respect to a foreground activity rate determined based on an amount of the foreground motion encoded in the first data feed. Particularly, the activity recognition system 101 determines a number of sampled frames for the second data feed based on the amount of foreground motion encoded in the first data feed within any given temporal window. For instance, considering a pedestrian walking in the surrounding environment as foreground motion, two frames from the second data feed may be sampled within a period of one second.

Upon adaptive sampling, the activity recognition system 101 recognizes the activities associated with at least one object in the surrounding environment by identifying a correlation between the first data feed and the second data feed using a two-stream neural network model.

Essentially, the correlation is performed by initiating a data-driven fusion between the first data feed and the second data feed. The two-stream neural network model may be implemented for instance, by Convolutional Neural Network (CNN) technique.

The two-stream neural network model comprises a first neural network model and a second neural network model, which are trained using a training dataset associated with spatial and temporal features obtained using frame based RGB video camera 107 and the neuromorphic event-based camera 105 which capture same scene simultaneously.

In order to recognise the activities, the first neural network of the two-stream neural network model analyzes the motion associated with the at least one object, as encoded in the first data feed. While, the second neural network analyzes the scene-level contextual information based on the adaptive-sampled data. Further, output of the first neural network model and the second neural network model are concatenated and weighted combination of the outputs are computed to determine the activities associated with the at least one object. Particularly, the weighted combination of the outputs indicates likelihoods of the activities of interest of at least one object.

Thus, upon determining the activities of the at least one object, the activity recognition system 101 may control the navigation of the autonomous vehicle 100. The navigation of the autonomous vehicle 100 may be controlled by managing acceleration and deceleration of the autonomous vehicle 100 depending on the determined activities.

Figure 2:
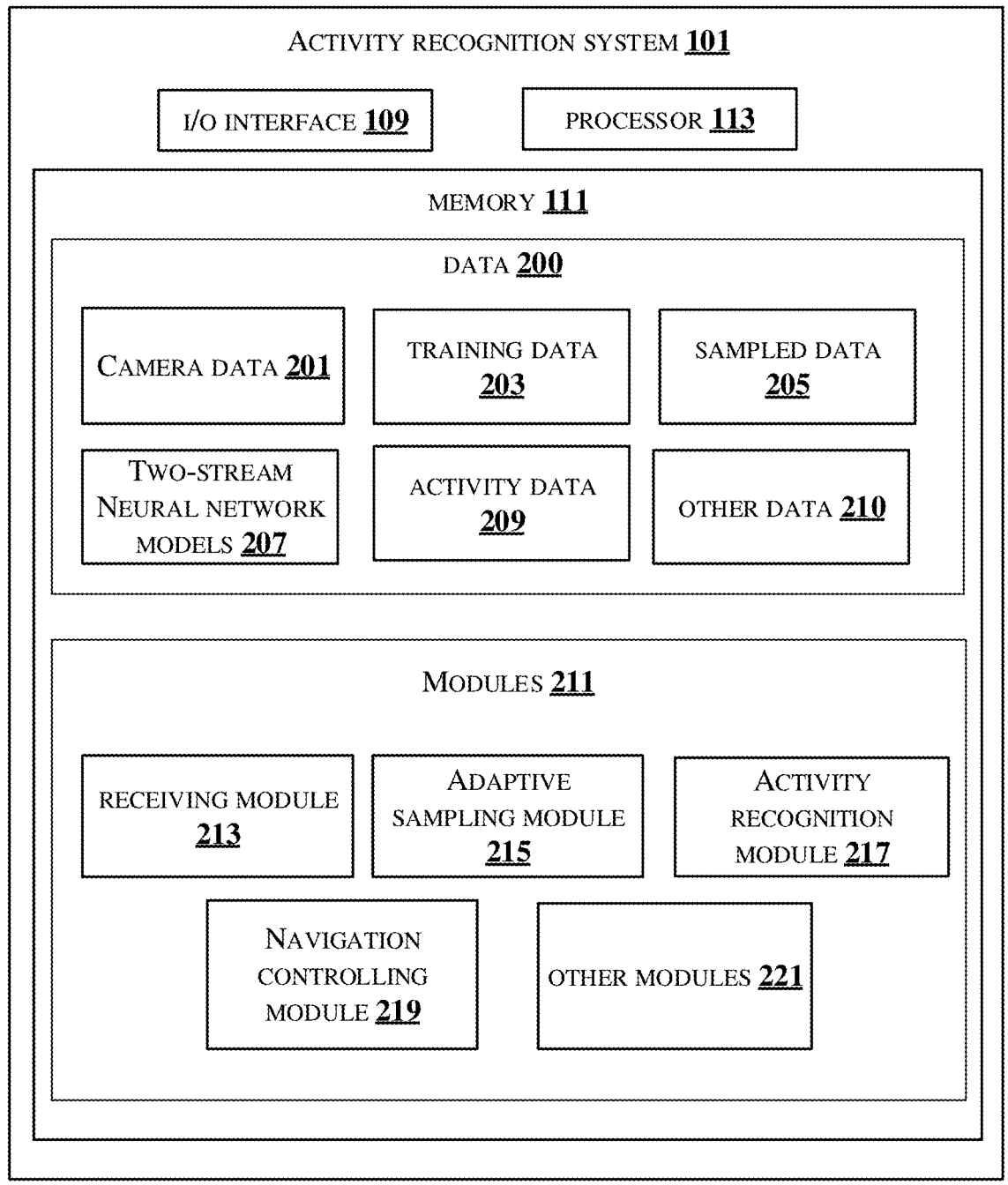
FIG. 2 shows a detailed block diagram of an activity recognition system in accordance with some embodiments of the present disclosure.

FIG. 2 shows a detailed block diagram of an activity recognition system in accordance with some embodiments of the present disclosure.

The activity recognition system 101 may include data 200 and one or more modules 211 which are described herein in detail. In an embodiment, data 200 may be stored within the memory 111. The data 200 may include, for example, camera data 201, training data 203, sampled data 205, two-stream neural network model 207, activity data 209 and other data 210.

The camera data 201 includes the data feed from the neuromorphic event-based camera 105 and the frame based RGB video camera 107. Particularly, the data feed includes the first data feed comprising the high-speed temporal information encoding motion associated with the change in the surrounding environment at each spatial location. Further, the data feed includes the second data feed which includes the spatio-temporal data providing the scene-level contextual information associated with the surrounding environment.

The training data 203 includes the training dataset associated with spatial and temporal features obtained using the frame based RGB video camera 107 and the neuromorphic event-based camera 105 for a same scene.

The sampled data 205 includes details about the number of sampled frames for the second data feed based on the amount of foreground motion encoded in the first data feed. Further, the sampled data 205 includes the foreground activity rate which is determined based on the foreground activity associated with objects in the foreground of the surrounding environment.

The two-stream neural network model 207 may include a machine learning model for recognizing the activities of objects in the surrounding environment. The two-stream neural network model 207 includes the first neural network model and the second neural network model. For instance, the two-stream neural network model 207 may include CNN models for recognising the activities of objects in the surrounding environment. The first neural network model may be for example, a three-dimensional (3D) CNN, while the second neural network model may be a two-dimensional (2D) CNN. A person skilled in the art would understand that CNN, and explicitly a 3D CNN and 2D CNN, is exemplary technique, and the machine learning models may also include any other machine learning combinations.

The activity data 209 may include the activities determined for the at least one object in the surrounding environment. The at least one object in the surrounding environment may be vehicles, pedestrian, and any other mobile object. For instance, the activity associated with other vehicles may be, vehicle moving left, right and the like, and activities associated with the pedestrian may be, pedestrian walking, or stopped and the like.

The other data 210 may store data, including temporary data and temporary files, generated by modules 211 for performing the various functions of the activity recognition system 101.

In an embodiment, the data 200 in the memory 111 are processed by the one or more modules 211 present within the memory 111 of the activity recognition system 101. In an embodiment, the one or more modules 211 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 211 may be communicatively coupled to the processor 113 for performing one or more functions of the activity recognition system 101. The said modules 211 when configured with the functionality defined in the present disclosure will result in a novel hardware.

In one implementation, the one or more modules 211 may include, but are not limited to a receiving module 213, an adaptive sampling module 215, an activity recognition module 217, and navigation control module 219. The one or more modules 211 may also include other modules 221 to perform various miscellaneous functionalities of the activity recognition system 101. The other modules 221 may include a training module which is configured for training the two-stream neural network model 207. The training module performs the training using the training dataset associated with the spatial and temporal features obtained using the frame based RGB video camera 107 and the neuromorphic event-based camera 105, which captures the same scene simultaneously. In an embodiment, the training module may use a simulator for generating RGB frames with corresponding boundary box information of other vehicles. Thus, this way, the training module excludes need for labelling the training dataset manually. Particularly, the training module is configured for converting simulated RGB data frame and generate a corresponding high temporal resolution event data, which is used for training the two-stream neural network model.

Further, since real-world condition may include a spectrum of climatic conditions and traffic condition, the training module may be configured to address variance present in the real-world conditions.

The receiving module 213 may receive the data feeds from the neuromorphic event-based camera 105 and the frame based RGB video camera 107. That is, from the neuromorphic event-based camera 105, the receiving module 213 receives the high-speed temporal information which encodes motion associated with the change in the surrounding environment at each spatial location within the field of view of the neuromorphic event-based camera 105. While, from the frame based RGB video camera 107, the receiving module 213 receives the spatio-temporal data which provides the scene-level contextual information associated with the surrounding environment. For instance, the scene may be a road with a vehicle on right lane.

The adaptive sampling module 215 may perform the adaptive sampling of the second data feed with respect to the foreground activity rate which is exhibited by the foreground objects based on the amount of foreground motion encoded in the first data feed. Particularly, the adaptive sampling module 215 performs the activity-based attention sampling. The first data feed encodes motion associated with number of foreground activities occurring at a particular time window. Based on the number of foreground activity, a variable/foreground activity rate is determined which corresponds to amount of foreground activity occurring in the scene.

The adaptive sampling module 215 uses the variable/foreground activity rate to decide the temporal window of the second data feed. That is, when the encoded motion from the first data feed possesses high activity rate (Ar) which depicts magnitude of foreground activity present in the scene, it demands a high sampling rate from the frame-based second data feed to extract contextual information for the scene.

Figure 3A:
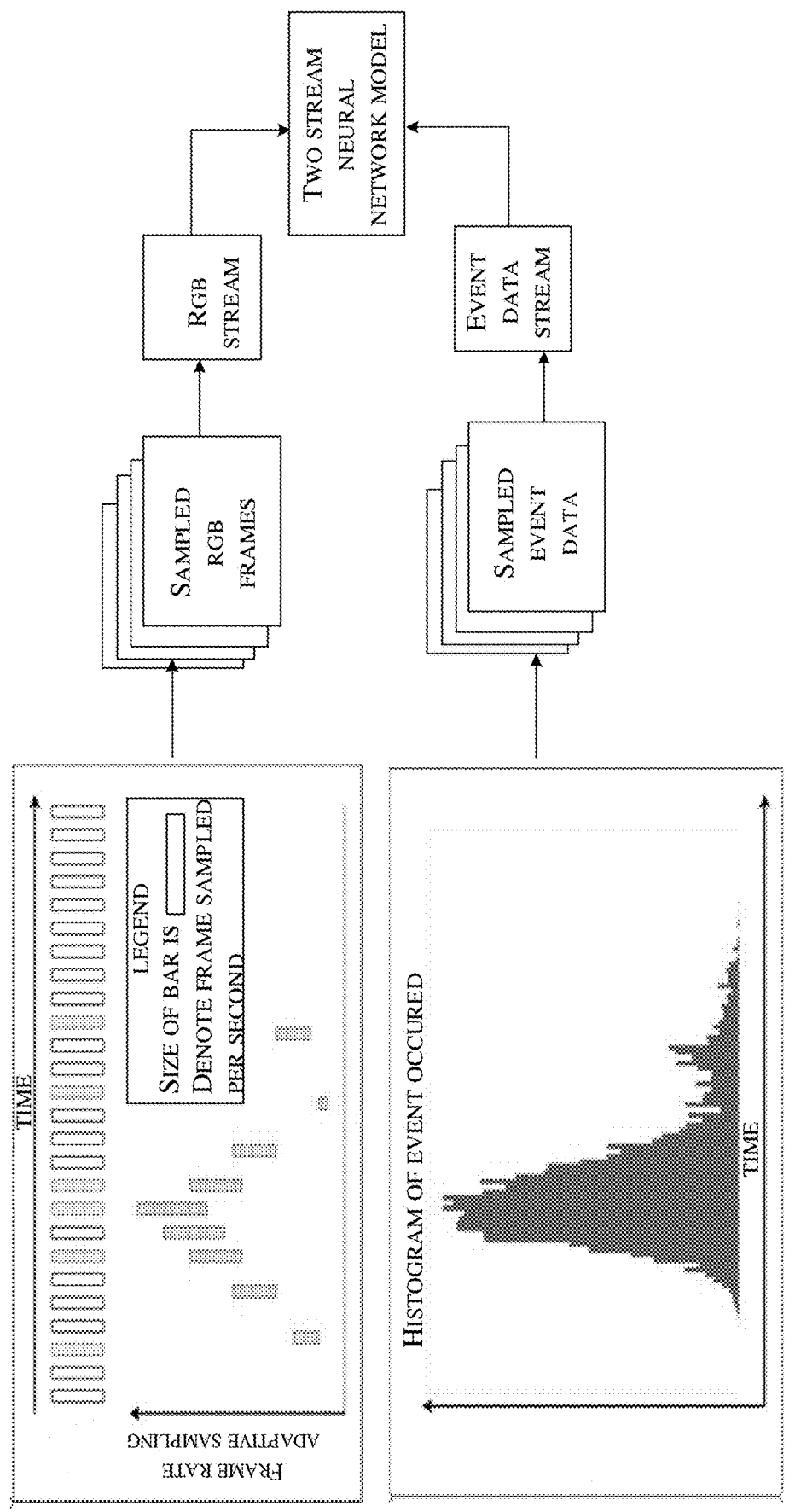
FIG. 3A shows an exemplary block for performing adaptive sampling technique in accordance with some embodiments of the present disclosure.
Figure 3B:
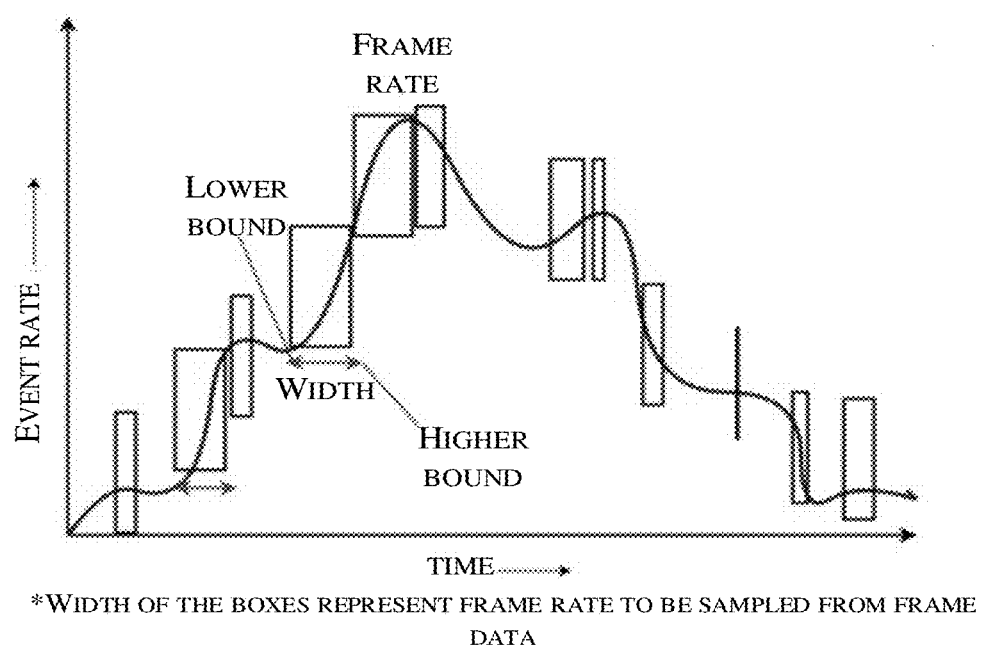
FIG. 3B shows an exemplary graphical representation for adaptive sampling based on activity rate in accordance with some embodiments of the present disclosure.

Likewise, when the foreground activity rate is low, demand for spatial information is less. Thus, a low sampling rate on the frame-based second data feed is sufficient enough to represent the activity when there is less encoded motion in the scene. FIG. 3B shows an exemplary graphical representation for adaptive sampling based on activity rate in accordance with some embodiments of the present disclosure. As shown in the FIG. 3B, in the graph, a width block represents the foreground activity rate defined at the given time window. In this context, upon computation of step difference among the foreground activity rate, the adaptive sampling module 215 may calculate the variance required to be sampled at the given time window, which is denoted by local variance distribution.

As shown, an upper/lower bound of the width corresponds to span of interval. As can be seen, frame rate increase when there is a rise in the rate of the foreground activities (in unit time) and nulls out when the foreground activity rate nulls. Thus, this technique encodes a relative sampling with an adaptive rate with respect to the occurrence of the foreground activities based on the encoded motion. Hence, the adaptive sampling module 215 bridges a direct co-relation with the number of foreground activities occurring, with the spatial and the temporal data. By using inherent features from the first data feed, overhead for computation is reduced by a large scale and at the same time performance is enhanced while reducing false positive cases as show in the FIG. 3B. Thereby, the adaptive sampling creates a symbiotic relation which indicates sampling the spatio-temporal data with respect to the temporal information. FIG. 3A shows an exemplary block for performing adaptive sampling technique in accordance with some embodiments of the present disclosure. FIG. 3A shows an exemplary sampling structure, where foreground activities generated are shown in terms of histogram in relation to the temporal information encoding motion at each foreground spatial location (corresponding to the spatial locations of the foreground objects). The spatio-temporal data from the frame based RGB video camera 107 are sampled accordingly with the variable frame rate.

Figure 4A:
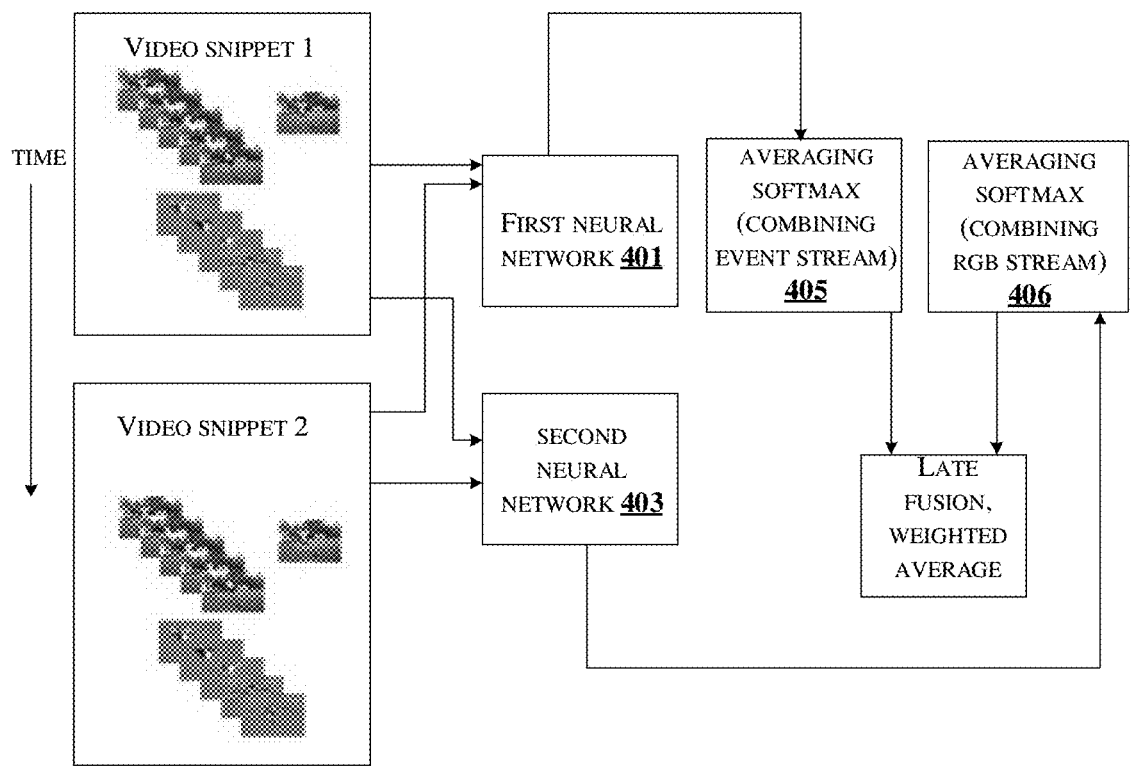
FIG. 4A shows an exemplary block diagram for representing two-stream neural network model for recognizing activities in accordance with some embodiments of present disclosure.

The activity recognition module 217 may recognize the activities associated with the at least one object in the surrounding environment by performing the data driven fusion on the first data feed and the second data feed using the two-stream neural network model 207. FIG. 4A shows an exemplary block diagram for representing two-stream neural network model for recognizing activities in accordance with some embodiments of present disclosure. As shown, the two-stream neural network model 207 includes a first neural network 401 and a second neural network 403. As shown in FIG. 4A, input data, i.e. video snippets (video snippet 1 and video snippet 2) are obtained by performing temporal windowing on a video related to an activity. For instance, consider an activity of one minute which is to be processed by the activity recognition system 101. The video data related to the activity may be split into predefined temporally equal blocks. For instance, in this scenario, the activity of one minute is split into two video snippets (video snippet 1 and video snippet 2) of 30 seconds each. Subsequently, adaptive sampling is performed and adaptively sampled RGB frames and all time/memory surfaces created from event streams from the video snippet 1 and the video snippet 2 are provided to the two-stream neural network model 207. That is, the adaptively sampled RBG frames from both video snippets (i.e., video snippet 1 and the video snippet 2) are provided to the second neural network 403. Likewise, the time/memory surfaces created from the event streams from both the video snippets (video snippet 1 and the video snippet 2) are provided to the first neural network 401.

The first neural network 401 analyses the motion associated with the at least one object, which is encoded in the event stream. The first neural network 401 is trained using training motion dataset. In an embodiment, the activity recognition on the motion encoded data requires architectures which encodes residual blocks to comprehend a highly temporally co-related data stream. Since neuromorphic event-based camera 105 captures only the changes occurring in the surrounding environment, it may record polarity change and remove background information while highlighting the foreground information with temporal data. The first neural network 401 may provide an output of a probability map of activity labels.

While the second neural network 403 may analyse the scene-level contextual information based on the adaptive-sampled data. In an embodiment, the second neural network 403 may be used as a secondary measure to validate recognition of the activities spatially. The second neural network 403 may comprehend a spatial temporal co-relation for the activities present in the scene. Hence, the second neural network 403 is used for either increasing the probability of the activity present in the encoded motion or to regulate false negative or false positive cases. Further, output of the second neural network 403 and the first neural network 401 are passed onto an averaging Softmax 406 and an averaging Softmax 405, respectively. The averaging Softmax 406 performs an averaging on the RGB frames associated with entire activity, while the averaging Softmax 405 performs an averaging of the event streams associated with the activity. Then, the output from the averaging Softmax 405 and the averaging Softmax 406 are concatenated by a late fusion averaging to determines the activity by determining a weighted average of the probability map from each output.

Figure 4B:
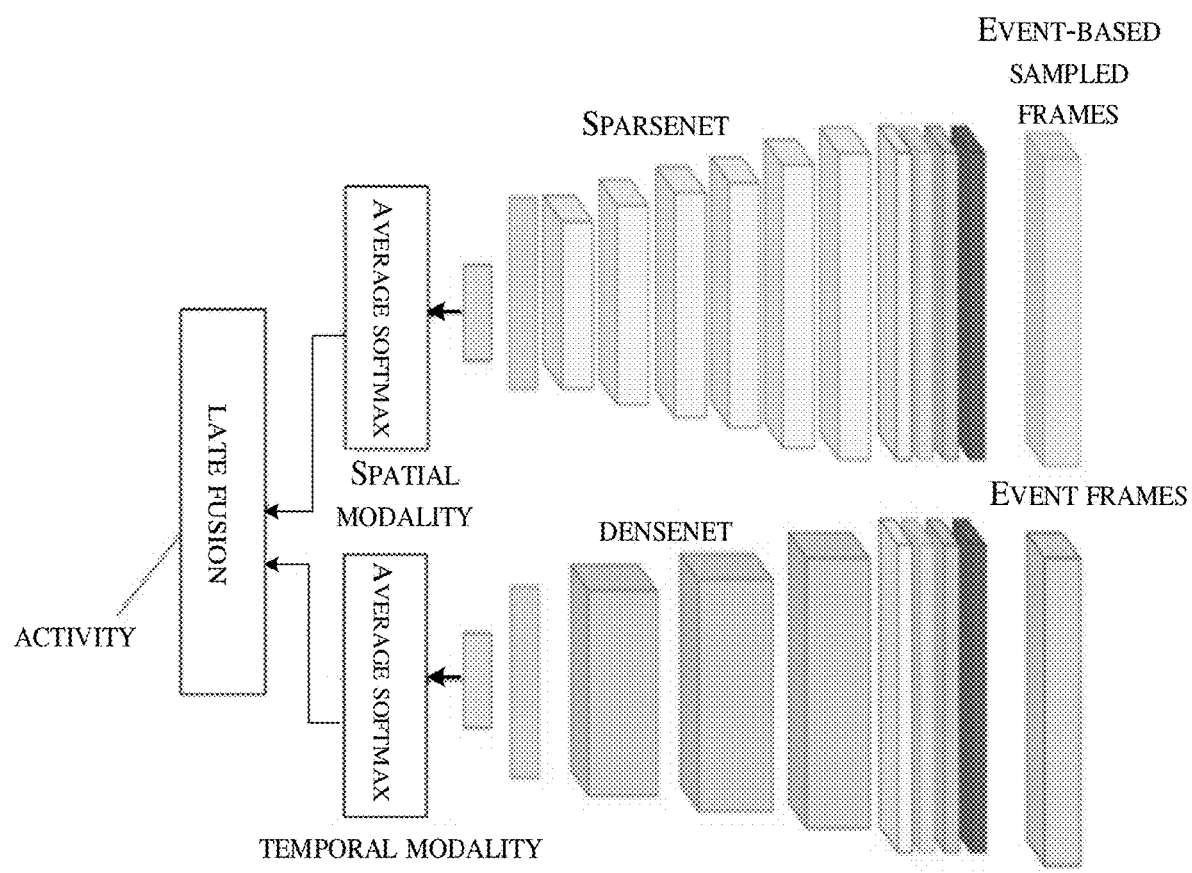
FIG. 4B-4C show exemplary block diagrams of convolutional neural network layers in accordance with some embodiments of present disclosure.
Figure 4C:
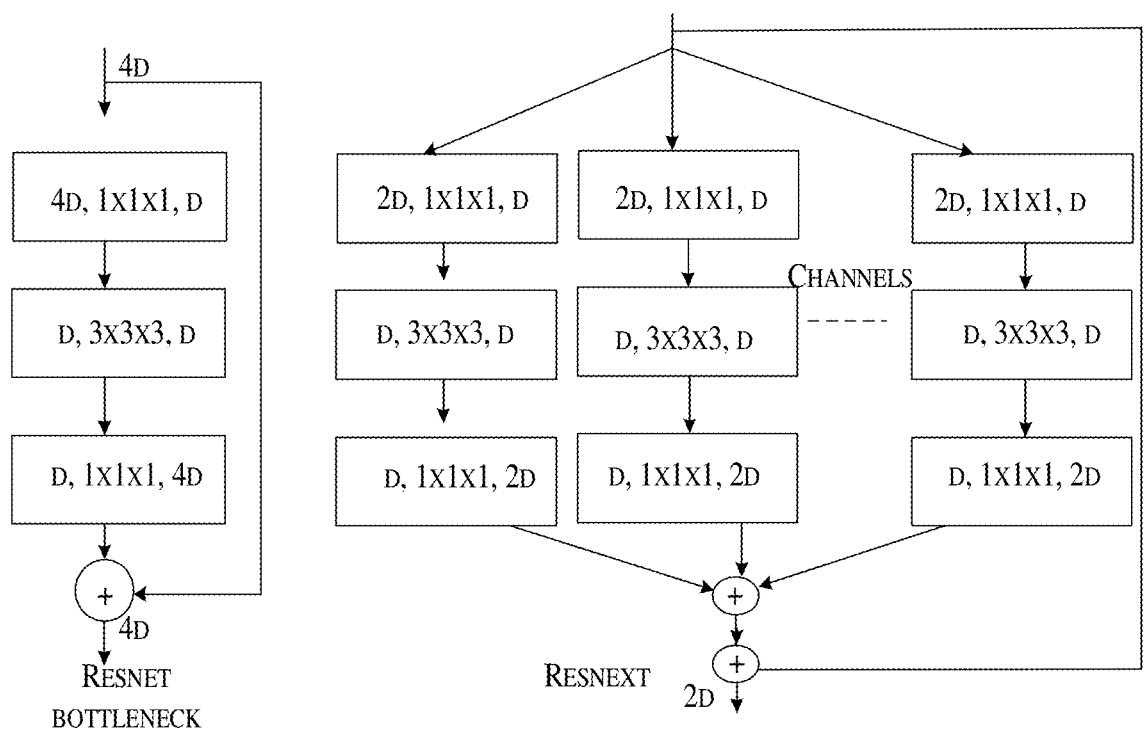

FIG. 4B-4C show exemplary block diagrams of convolutional neural network layers in accordance with some embodiments of present disclosure. As shown, the convolutional neural network layers include ResNet101 and ResNeXt101 which denote RGB and neuromorphic channels, respectively. As shown in FIG. 4C, a ResNet bottleneck block consists of three convolution layers. 1D CNN blocks are used to adjust depth of input sensors, while the 3D CNN blocks are used to extract features and at the same time preserve spatial dimension. On other hand, ResNeXt architectures as shown, may introduce cardinality, which spawns concurrent Resnet bottleneck blocks to increase efficiency of ResNet architectures. In an embodiment, for the RGB channel, a stochastic gradient descent with for example, 0.9 momentum is used. Further, a learning rate, for example, 0.001 and weight decay of for example, 5e−4 is used. In an embodiment, the learning rate is decayed by for instance, 0.1 for every 20, 40 and 80 epochs.

In an embodiment, for the neuromorphic channels, a stochastic gradient descent was used with momentum of, for example 0.9. The learning rate and weight decay may be set at for instance, 0.1 and 1e−3, respectively. In an embodiment, the learning rate may be reduced by for instance, 0.1, if the validation loss does not decrease after 10 epochs.

Further, the two-stream neural network model 207 may combine Softmax scores in two different phases in architecture. First, by combining prediction of different video snippets/or the data feeds from different temporal windows. Second, by combining predictions of individual channels.

Further, to combine the outputs using the Softmax prediction, the activity recognition module 217 uses for instance, average/max pooling. In max pooling, a max operation is applied to the Softmax score of each class among all the video snippets/data feeds. On the other hand, an average pooling is performed by using an average function over the Softmax scores for each class of all data feeds. In an embodiment, Late Fusion technique is used for combining Softmax predictions. In an embodiment, weights of individual channel may be proportional to 'channel+split' accuracy on that dataset. Thus, first an accuracy on each split is evaluated and then average of the accuracies is performed over all the splits to get a final accuracy.

Returning to FIG. 2, the navigation control module 219 may be configured to control the navigation of the autonomous vehicle 100 by managing acceleration and deceleration of the autonomous vehicle 100 based on the determined activities. For instance, if the activity of a vehicle in front of the autonomous vehicle 100 is determined to be sudden decease in speed, the acceleration of the autonomous vehicle 100 may be controlled accordingly.

FIG. 5A-5B shows an exemplary embodiment surrounding environment for recognising activities for controlling navigation of an autonomous vehicle of present disclosure.

FIG. 5A shows an exemplary surrounding environment of a road in which the autonomous vehicle 100 is moving. The autonomous vehicle 100 receives first data feed from a neuromorphic event-based camera 501 and the second data feed from a frame-based RGB video camera 503. The neuromorphic event-based camera 501 samples a pixel in accordance with a scene 505, in front based on changes posed in field of view. In an embodiment, the sampling rate of neuromorphic event-based camera 501 may be 1 MHz. An exemplary representation of the first data feed and the second data feed is represented by 507 and 509, respectively. The activity recognition system 101 of the autonomous vehicle 100 may use the temporal data encoded motion and sample spatio-temporal data from the frame-based RGB video camera 503 using the sampling rate. In accordance with temporal information which the neuromorphic event-based camera 501 encounters in the encoded motion, the activity recognition system 101 may scale to sample the second data feed 509 from the frame-based RGB video camera 503. Henceforth, in case of rapid foreground objects' motion, the foreground activity rate may also increase. Likewise, in a traffic scenario, where there is very less foreground motion, the neuromorphic event-based camera 501 may records less temporal information and correspondingly the RGB frames are also sampled with lesser bandwidth.

Further, upon sampling, the activity recognition system 101 may recognize the activities in the scene 505 by using the two-stream neural network model 207 of the activity recognition system 101. Among the two-stream neural network model 207, the first neural network model analyses the motion associated with the at least one object, as encoded in the first data feed data feed 507. While, the second neural network model may analyse the scene-level contextual information based on the adaptive-sampled data. The output from each of the first and second neural network models is combined to provide a weighted average of the outputs and to determine the activities in the scene 505. FIG. 5B shows an exemplary representation of output of the activity recognition system 101, which indicates the activity of the autonomous vehicle 100, i.e., an autonomous car 500 as "moving left".

FIG. 6 illustrates a flowchart showing a method for recognising activities in surrounding environment for controlling navigation of an autonomous vehicle in accordance with some embodiments of present disclosure.

As illustrated in FIG. 6, the method 600 includes one or more blocks for recognising activities in surrounding environment. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 601, the first data feed and the second data feed are received by the receiving module 213 from the neuromorphic event-based camera 105 and the frame based RGB video camera 107. The first data feed includes the temporal information encoding motion associated with the change in the surrounding environment at each spatial location. While, the second data feed includes the spatio-temporal data providing the scene-level contextual information associated with the surrounding environment.

At block 603, the adaptive sampling of the second data feed is performed by the adaptive sampling module 215 with respect to the foreground activity rate which is determined based on amount of foreground motion encoded in the first data feed. Particularly, the adaptive sampling is performed to determine the number of sampled frames for the second data feed based on the amount of foreground motion encoded in the first data feed within the given temporal window.

At block 605, the activities associated with at least one object in the surrounding environment is recognised by the activity recognition module 217 by identifying the correlation between the first data feed and the second data feed by using the two-stream neural network model. In an embodiment, the at least one object in the surrounding environment includes, the vehicles, pedestrian, and any other mobile object. The first neural network of the two-stream neural network model analyzes motion associated with the at least one object, as encoded in the first data feed. While the second neural network of the two-stream neural network model analyzes the scene-level contextual information based on the adaptive-sampled data. Further, the outputs of the first neural network model and the second neural network model are combined to compute the weighted combination of the outputs, to determine the activities associated with the at least one object.

At block 607, the navigation of the autonomous vehicle 100 is controlled by the navigation control module 219 based on the determined activities. In an embodiment, the navigation of the autonomous vehicle 100 is controlled by managing acceleration and deceleration of the autonomous vehicle 100 based on the determined activities of the at least one object in the surrounding environment.

Advantages of the Present Disclosure

An embodiment of the present disclosure provides an end-to-end trainable bio-inspired deep learning two stream architecture which bridges event data and the conventional frame-based data for egocentric vehicle activity recognition. This aids a spatio-temporal relevance of the activity.

An embodiment of the present disclosure eliminates extensive computations and resource overhead and thus helps to perform a real-time determination of driving environment perception.

An embodiment of the present disclosure enhances accuracy of determination of activities in the surrounding environment by overcoming low-light and motion-blur conditions.

The disclosed method and system overcome technical problem of recognition activities of surrounding objects efficiently by utilizing feeds from a neuromorphic event-based camera and frame-based RGB video camera for activity recognition. Particularly, an adaptive sampling of feed from the frame based RGB video camera is performed with respect to a foreground activity rate which is based on motions encoded from feed of neuromorphic camera feed for identifying spatial feature of the activities. Further, activities associated with at least one object in the surrounding environment is recognised by analysing and combined both the feeds using a two-stream neural network model which identifies relevant motion and scene-level contextual information based on the adaptive-sampled data. As a result, the present disclosure provides a lightweight end to end trainable bio-inspired deep learning two stream architecture which bridges event data and conventional frame-based data for vehicle activity recognition which aids in spatio-temporal relevance of the activity.

Currently activity recognition from conventional videos feed comes with its own set of challenges such as, intraclass variation and interclass similarity, complex and diverse backgrounds, multi-subject interactions and group activities, long-distance and low-quality videos, and the like. Also, determination of accurate DEP by correlating multi-sensor feeds including GNSS increases computational complexity and resource intensive operation. Also, performing such operations on a semi-real-time mode may not be feasible to implement for an AV-ADAS system. Thus, currently, activity recognition in AV can be considered as a classical problem, which involves classification of different activities of other vehicles and pedestrians, like vehicle acceleration, deceleration, moving left, moving right, and pedestrian crossing road and the like.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the system itself as the claimed steps provide a technical solution to a technical problem.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessors, and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 6 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Autonomous vehicle |
| 101 | Activity recognition system |
| 103 | Camera unit |
| 105, 501 | Neuromorphic event-based camera |
| 107, 503 | Frame-based RGB video camera |
| 109 | I/O interface |
| 111 | Memory |
| 113 | Processor |
| 200 | Data |
| 201 | Camera data |
| 203 | Training data |
| 205 | Sampled data |
| 207 | Two- stream neural network model |
| 209 | Activity data |
| 210 | Other data |
| 211 | Modules |
| 213 | Receiving module |
| 215 | Adaptive sampling module |
| 217 | Activity recognition module |
| 219 | Navigation control module |
| 221 | Other modules |
| 401 | First neural network |
| 403 | Second neural network |
| 405, 406 | Averaging Softmax |
| 505 | Scene |
| 507 | First data feed |
| 509 | Second data feed |

What is claimed is:

1. A method of recognising activities in surrounding environment for controlling navigation of an autonomous vehicle, the method comprising:
   receiving, by an activity recognition system of the autonomous vehicle, a first data feed from a neuromorphic event-based camera and a second data feed from a frame-based RGB video camera, configured in the autonomous vehicle, wherein the first data feed comprises high-speed temporal information encoding motion associated with a change in the surrounding environment at each spatial location, and the second data feed comprises spatio-temporal data providing scene-level contextual information associated with the surrounding environment;
   performing, by the activity recognition system, adaptive sampling of the second data feed with respect to a foreground activity rate based on an amount of foreground motion encoded in the first data feed;
   recognizing, by the activity recognition system, activities associated with at least one object in the surrounding environment by identifying a correlation between the first data feed and the second data feed by using a two-stream neural network model, wherein a first neural network of the two-stream neural network model analyzes motion associated with the at least one object, as encoded in the first data feed, and a second neural network of the two-stream neural network model analyzes the scene-level contextual information based on the adaptive-sampled data; and
   controlling, by the activity recognition system, the navigation of the autonomous vehicle based on the determined activities.

2. The method as claimed in claim 1, wherein performing the adaptive sampling comprises determining a number of sampled frames for the second data feed based on the amount of foreground motion encoded in the first data feed within any given temporal window.

3. The method as claimed in claim 1, wherein the at least one object in the surrounding environment comprises vehicles, pedestrians, and any other mobile object.

4. The method as claimed in claim 1, wherein the two-stream neural network model is trained using a training dataset associated with spatial and temporal features obtained using a frame-based RGB video camera and a neuromorphic event-based camera, capturing the same scene simultaneously.

5. The method as claimed in claim 1, wherein determining the activities associated with at least one object further comprises computing a weighted combination of the outputs, as given by the first neural network and the second neural network.

6. The method as claimed in claim 1, wherein the spatio-temporal data is of lower temporal resolution than the high-speed temporal information encoding motion comprised within the first data feed.

7. The method as claimed in claim 1, wherein controlling the navigation of the autonomous vehicle comprises managing acceleration and deceleration of the autonomous vehicle based on the determined activities.

8. An activity recognition system for determining activities in surrounding environment for controlling navigation of an autonomous vehicle, comprising:
   a processor; and
   a memory communicatively coupled to the processor, wherein the memory stores processor instructions, which, on execution, causes the processor to:
      receive a first data feed from a neuromorphic event-based camera and a second data feed from a frame-based RGB video camera, configured in the autonomous vehicle, wherein the first data feed comprises high-speed temporal information encoding motion associated with a change in the surrounding environment at each spatial location, and the second data feed comprises spatio-temporal data providing scene-level contextual information associated with the surrounding environment;
      performing, by the activity recognition system, adaptive sampling of the second data feed with respect to a foreground activity rate based on an amount of foreground motion encoded in the first data feed;
      recognize activities associated with at least one object in the surrounding environment by identifying a correlation between the first data feed and the second data feed by using a two-stream neural network model, wherein a first neural network of the two-stream neural network model analyzes motion associated with the at least one object, as encoded in the first data feed, and a second neural network of the two-stream neural network model analyzes the scene-level contextual information based on the adaptive-sampled data; and
      control the navigation of the autonomous vehicle based on the determined activities.

9. The activity recognition system as claimed in claim 8, wherein the processor performs adaptive sampling by determining a number of sampled frames for the second data feed based on the amount of foreground motion encoded in the first data feed within any given temporal window.

10. The activity recognition system as claimed in claim 8, wherein the at least one object in the surrounding environment comprises vehicles, pedestrians, and any other mobile object.

11. The activity determination system as claimed in claim 8, wherein the processor trains the two-stream neural network model using training dataset associated with spatial and temporal features obtained using a frame-based RGB video camera and a neuromorphic event-based camera, capturing the same scene simultaneously.

12. The activity recognition system as claimed in claim 8, wherein the processor determines the activities associated with at least one object by computing a weighted combination of the outputs, as given by the first neural network and the second neural network.

13. The activity recognition system as claimed in claim 8, wherein the spatio-temporal data is of lower temporal resolution than the high-speed temporal information encoding motion comprised within the first data feed.

14. The activity recognition system as claimed in claim 8, wherein the processor controls the navigation of the autonomous vehicle by managing acceleration and deceleration of the autonomous vehicle based on the determined activities.

15. A non-transitory computer readable medium including instruction stored thereon that when processed by at least one processor cause an activity recognition system to perform operation comprising:
   receiving a first data feed from a neuromorphic event-based camera and a second data feed from a frame-based RGB video camera, configured in the autonomous vehicle, wherein the first data feed comprises high-speed temporal information encoding motion associated with a change in the surrounding environment at each spatial location, and the second data feed comprises spatio-temporal data providing scene-level contextual information associated with the surrounding environment;
   performing adaptive sampling of the second data feed with respect to a foreground activity rate based on an amount of foreground motion encoded in the first data feed;
   recognizing activities associated with at least one object in the surrounding environment by identifying a correlation between the first data feed and the second data feed by using a two-stream neural network model, wherein a first neural network of the two-stream neural network model analyzes motion associated with the at least one object, as encoded in the first data feed, and a second neural network of the two-stream neural network model analyzes the scene-level contextual information based on the adaptive-sampled data; and
   controlling the navigation of the autonomous vehicle based on the determined activities.

* * * * *